United States Patent Office 3,408,344
Patented Oct. 29, 1968

3,408,344
3-AMINO-2-CYCLOBUTEN-1-ONE COMPOUNDS AND PROCESS FOR THEIR PREPARATION
James C. Martin, Kingsport, Tenn., assignor to Eastman Kodak Company, Rochester, N.Y., a corporation of New Jersey
No Drawing. Filed Nov. 23, 1964, Ser. No. 413,281
7 Claims. (Cl. 260—239)

ABSTRACT OF THE DISCLOSURE 3-amino-2-cyclobuten-1-one compounds are prepared by reacting a 3-alkoxy-2-cyclobuten-1-one compound with certain organic amines. The 3-amino-2-cyclobuten-1-one compounds are useful, for example, as corrosion inhibitors for ferrous alloys and as chemical intermediates in the production of other useful compounds such as cyanine dyes.

---

This invention relates to novel chemical compounds and to their preparation. More particularly, it relates to novel 3-amino-2-cyclobuten-1-one compounds and to novel methods for preparing them.

The novel 3-amino-2-cyclobuten-1-one compounds have the formulas:

(I) 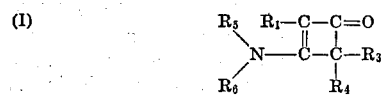

(II) 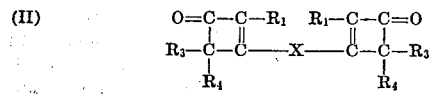

and (III) 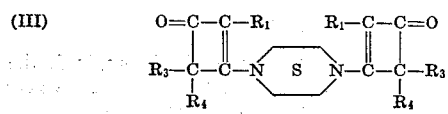

wherein $R_1$ represents a hydrogen atom or a lower alkyl radical (i.e. having from 1 to 4 carbon atoms), $R_3$ and $R_4$ each represents an alkyl radical, $R_5$ and $R_6$ each represents a hydrogen atom, an alkyl radical, a cyanoalkyl radical, a hydroxyalkyl radical or a monocyclic aryl nucleus, X represents a

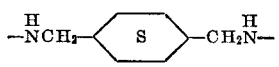

radical or a

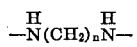

radical, $n$ represents a whole number from 2 to 6, and wherein

collectively, can be the radical of a cyclic monoamine. Preferably, $R_3$ and $R_4$ have from 1 to 4 carbon atoms although they can have from 1 to 8, or higher, carbon atoms. Similarly, when either $R_5$ or $R_6$ (or both) is an alkyl radical the alkyl radical preferably has from 1 to 4 carbon atoms although it can have from 1 to 8, or higher, carbon atoms.

The new 3-amino-2-cyclobuten-1-one compounds of the invention having the Formula I are prepared by reacting the corresponding 3-alkoxy-2-cyclobuten-1-one compounds having the formula:

(IV) 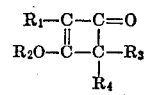

with an amine having the formula:

(V) 

wherein $R_2$ represents a lower alkyl radical and $n$, $R_1$, $R_3$, $R_4$, $R_5$, $R_6$ and

collectively, have the meaning previously assigned to them.

The new 3-amino-2-cyclobuten-1-one compounds of the invention having the Formula II are prepared by reacting the 3-alkoxy-2-cyclobuten-1-one compounds having the Formula IV with an alkylene diamine having the formula:

(VI) 

wherein Y represents a

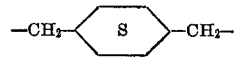

radical or a straight chain alkylene radical having 2 to 6 carbon atoms.

The new 3-amino-2-cyclobuten-1-one compounds of the invention having the Formula III are prepared by reacting the 3-alkoxy-2-cyclobuten-1-one compounds having the Formula IV with piperazine.

Van Daalen, Kraak and Arens have reported in Rec. trav. chim. 80, 813, 817, 818 (1961) that when 2-n-butoxy - 1,3 - dimethylcyclobut-2-ene-4-one was refluxed with aniline the anil of pentane-3-one, the butyl ester of phenylcarbamic acid, butanol and N,N¹-diphenylurea where produced. None of these products was produced in the process of the present invention.

The new 3-amino-2-cyclobuten-1-one compounds of the invention are prepared in accordance with the process of the invention by mixing the amine or ammonia reactant with the 3-alkoxy-2-cyclobuten-1-one reactant, with or without a solvent, and isolating the desired product by distillation or recrystallization. Suitable solvents include water, alcohols, esters, nitriles, aliphatic or aromatic hydrocarbons, chlorinated hydrocarbons and ethers. Suitable reaction temperatures are in the range of about 10° C. to 150° C. Higher temperatures within this range are preferably employed when a less reactive amine reactant is involved. For reasons of economy the reactants are preferably used in the molar ratio of 1:1 but other ratios can be used if desired. An excess of either reactant can be used. The use of a solvent is generally preferred.

Suitable solvents are materials that serve to dissolve the reagents involved in the process but which do not react with them. Suitable inert solvents include, for example, diethyl ether, diisopropyl ether, dioxane, tetrahydrofuran, diethylketone, methylisobutylketone, hexane, naphtha, isooctane, benzene, toluene, xylene, carbon tetrachloride, chloroform, tetrachloroethane, acetonitrile, isobutyronitrile, ethyl acetate, butyl acetate, ethyl alcohol, propyl alcohol, butyl alcohol, etc., and dipolar aprotic solvents such as dimethyl formamide, ethylene carbonate, sulfolane, etc.

$R_3$ and $R_4$ each typically represents an alkyl radical having 1 to 8 carbon atoms such as methyl, ethyl, propyl, isopropyl, butyl, pentyl, hexyl, heptyl, octyl, 2-ethylhexyl, etc. although they can be a higher alkyl radical such as nonyl and decyl, for example. Preferably $R_3$ and $R_4$ each represents a lower alkyl radical, e.g., of 1 to 4 carbon atoms.

When either $R_5$ or $R_6$ (or both) is an alkyl radical each typically represents an alkyl radical having 1 to 8 carbon atoms such as methyl, ethyl, propyl, isopropyl, butyl, sec. butyl, tert. butyl, pentyl, hexyl, heptyl, octyl, 2-ethylhexyl, etc. although they can be a higher alkyl radical such as nonyl and decyl, for example. When either $R_5$ or $R_6$ (or both) is an alkyl radical preferably each represents a lower alkyl radical, i.e., of 1 to 4 carbon atoms.

Ammonia, methylamine, ethylamine, propylamine, isopropylamine, butylamine, amylamine, hexylamine, heptylamine, octylamine, nonylamine, decylamine, β-cyanoethylamine, γ-cyanopropylamine, β-hydroxyethylamine, γ-hydroxypropylamine, dimethylamine, diethylamine, dipropylamine, dibutylamine, dihexylamine, dioctylamine, didecylamine, aniline, p-methylaniline, p-methoxyaniline, p-ethoxyaniline, diphenylamine, di(p‑methoxyphenyl)amine, di(p-methylphenyl)amine, morpholine, piperidine, pyrrolidine, bicyclo[3.2.2]-3-azanonane, N-methylaniline, N-ethylaniline, N-butylaniline, N-β-hydroxyethylaniline, N-γ-hydroxypropylaniline, N‑β‑cyanoethylaniline and N-γ-cyanopropylaniline, for example, are illustrative of the amines used in the preparation of the novel 3-amino-2-cyclobuten-1-one compounds of the invention.

The following examples illustrate the invention:

EXAMPLE 1

A mixture of 20 g. (0.14 mole) of 3-ethoxy-4,4-dimethyl-2-cyclobuten-1-one and 40 ml. of 28% ammonium hydroxide was stirred at room temperature for 4 hours. The resulting solid was isolated by filtration, washed with water, and dried in air. There was obtained 13.9 g. (89%) of 3-amino-4,4-dimethyl-2-cyclobuten-1-one, M.P. 213° C. (decomposition). An analytical sample was recrystallized from ethanol; M.P. 213° C. (dec.).

*Analysis.*—Calcd. for $C_6H_9NO$: C, 64.9; H, 8.1; N, 12.6. Found: C, 65.0; H, 8.3; N, 12.6.

The n.m.r. spectrum of this material, measured at 40 megacycles on a Varian 4300B instrument, showed peaks (in c.p.s. relative to water as an external standard):

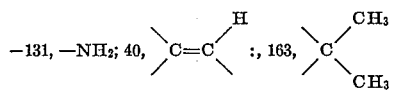

The relative area ratios were 2:1:6.

EXAMPLE 2

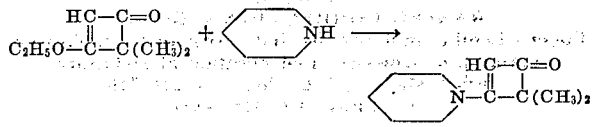

A solution of 40 g. (0.285 mole) of 3-ethoxy-4,4-dimethyl-2-cyclobuten-1-one and 24.3 g. (0.285 mole) of piperidine in 100 ml. of benzene was refluxed for 5 hours. Most of the benzene was removed by distillation at atmospheric pressure. The residue crystallized on cooling to give 50.4 g. (98%) of crude 3-piperidino-4,4-dimethyl-2-cyclobuten-1-one. Upon being recrystallized two times from a mixture of benzene and hexane the 3-piperidino-4,4-dimethyl-2-cyclobuten-1-one product melted at 104° C.–104.5° C.

*Analysis.*—Calcd. for $C_{11}H_{17}NO$: C, 73.9; H, 9.5; N, 7.8. Found: C, 74.0; H, 9.8; N, 7.7.

The n.m.r. spectrum agreed with the structure assigned to this material.

EXAMPLE 3

A solution of 42 g. (0.3 mole) of 3-ethoxy-4,4-dimethyl-2-cyclobuten-1-one and 27.6 g. (0.3 mole) of aniline in 100 ml. of acetonitrile was refluxed for 60 hours. The infrared spectrum of the reaction solution indicated that the starting material was gone and new bands characteristic of the product appeared. The solution was taken to dryness on the steam bath to give 53.2 g. of a crystalline residue. Recrystallization from hexane gave 3-anilino-4,4-dimethyl-2-cyclobuten-1-one, having a M.P. of 106° C.–108° C.

EXAMPLE 4

Under the general conditions used in Example 3, the amines and 3-alkoxy-2-cyclobuten-1-one compounds give the products shown in the following tabulation.

| Amine | Cyclobutenone | Product |
|---|---|---|
| p-Methoxyaniline | 3-ethoxy-4,4-dimethyl-2-cyclobuten-1-one. | 3-(p-methoxyanilino)-4,4-dimethyl-2-cyclo-buten-1-one. |
| (Di-β-cyanoethyl)-amine | do | 3-(di-β-cyanoethyl)-amino-4,4-dimethyl-2-cyclobuten-1-one. |
| 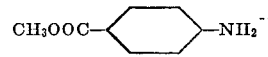 CH₃OOC—⟨⟩—NH₂ | do | 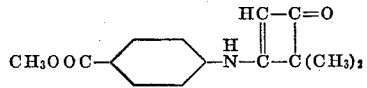 |
| 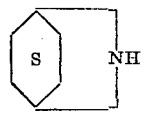 (Bicyclo[3.2.2]-3-azanonane) | 3-ethoxy-4,4-dibutyl-2-cyclobuten-1-one. | 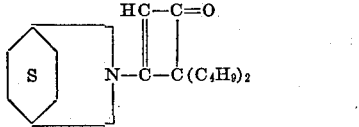 |
| β-Hydroxyethylamine | 3-butoxy-4,4-diethyl-2-cyclobuten-1-one. | 3-(β-hydroxyethylamino)-4,4-diethyl-2-cyclobuten-1-one. |
| 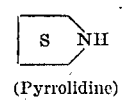 (Pyrrolidine) | 3-ethoxy-2,4,4-trimethyl-2-cyclobuten-1-one. | 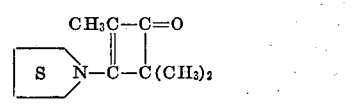 (3-pyrrolidino-2,4,4-trimethyl-2-cyclobuten-1-one). |
| H₂N(CH₂)₆NH₂ | 3-ethoxy-4,4-dimethyl-2-cyclobuten-1-one. |  |

| Amine | Cyclobutenone | Product |
| --- | --- | --- |
| Piperazine | do | 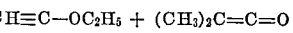<br>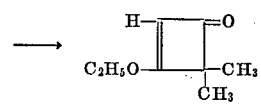 |
| Piperidine | 3-ethoxy-4,4-dibutyl-2-cyclobuten-1-one. | 3-piperidino-4,4-dibutyl-2-cyclobuten-1-one. |
| Pyrrolidine | do | 3-pyrrolidino-4,4-dibutyl-2-cyclobuten-1-one. |
| β-Cyanoethylamine | 3-ethoxy-4,4-dipropyl-2-cyclobuten-1-one. | 3-(β-cyanoethylamino)-4,4-dipropyl-2-cyclobuten-1-one. |

EXAMPLE 5

A mixture of 70 g. (0.5 mole) of 3-ethoxy-4,4-dimethyl-2-cyclobuten-1-one and 62 g. (2.0 moles) of methylamine is heated in an autoclave at 150° for 6 hrs. Distillation of the reaction product through a 10-in. packed column gives a good yield of 3-methylamino-4,4-dimethyl-2-cyclobuten-1-one.

By the use of an equivalent amount of ethylamine, isopropylamine, propylamine and butylamine, respectively, in place of methylamine in Example 5, 3-ethylamino-4,4-dimethyl-2-cyclobuten-1-one, 3-isopropylamino-4,4-dimethyl-2-cyclobuten-1-one, 3-propylamino-4,4-dimethyl-2-cyclobuten-1-one and 3-butylamino-4,4-dimethyl-2-cyclobuten-1-one, respectively, are obtained.

The 3-alkoxy-2-cyclobuten-1-one compounds used in the preparation of the 3-amino-2-cyclobuten-1-one compounds of the invention are described in U.S. Patent 3,288,854.

In accordance with U.S. Patent 3,288,854 the 3-alkoxy-2-cyclobuten-1-one compounds are prepared by cycloaddition of dialkylketenes to alkoxyacetylenes. They are useful chemical intermediates, for example, in the preparation of cyanine dyes useful as photographic spectral sensitizers and esters useful as plasticizers for synthetic resins and in the preparation of compounds having pharmaceutical activity. They are also useful directly as plasticizers and are stable at temperatures up to 150° C. Their thermal stability is a valuable attribute because it eliminates the formation of by-product substituted naphthol compounds.

The preparation of the alkoxycyclobutenone compounds can be accomplished by mixing the dialkylketene with the alkoxyacetylene, with or without a solvent. Suitable solvents include both polar and nonpolar solvents such as aliphatic or aromatic hydrocarbons, ethers, chlorinated hydrocarbons, esters and nitriles. Suitable reaction temperatures are in the range of about 0 to 150° C. Higher temperatures within this range are preferably employed for the less reactive ketenes. For reasons of economy the reactants are preferably used in the molar ratio of 1:1 but other ratios can be used if desired.

The dialkylketenes used are of the type, $R^1R^2=C=O$, wherein $R^1$ and $R^2$ are alkyl groups. It will be understood that for convenience, the term "dialkylketene" is used in its broad sense to include those compounds in which $R^1$ and $R^2$ are alkylene radicals that form a ring with the carbon to which they are attached. Examples of suitable dialkylketenes include: dimethylketene, ethylmethylketene, methylpropylketene, butylethylketene, diethylketene, pentamethyleneketene, hexamethyleneketne, ethylisobutylketene and the like.

The alkoxyacetylenes used are of the type, $$R^3—C\equiv C—OR^4$$

wherein $R^3$ is hydrogen or a lower alkyl radical and $R^4$ is a lower alkyl radical. Suitable alkoxyacetylenes have been described by Arens in "Advance in Organic Chemistry," R. A. Raphael et al., editors; Interscience Publishers, Inc., New York, New York, 1960, pages 127–129. Typical examples include: ethoxyacetylene, methoxyacetylene, 1-ethoxypropyne, 1-ethoxy-1-heptyne and the like.

The following examples illustrate the preparation of the 3-alkoxy-2-cyclobuten-1-one compounds having the Formula IV.

EXAMPLE 6

$$CH\equiv C—OC_2H_5 + (CH_3)_2C=C=O \longrightarrow$$

To a stirred solution of 98 g. (1.4 moles) of ethoxyacetylene in 300 ml. of hexane was added 98 g. (1.4 moles) of dimethylketene. The reaction was slowly exothermic, and an ice bath was used to keep the temperature below 40° C. After stirring for 5 hours, the solution was distilled through a 12-inch packed column to give 111 g. (57%) of 3-ethoxy-4,4-dimethyl-2-cyclobuten-1-one, B.P. 62–63° (2.5 mm.), $n_D^{20}$ 1.4583.

*Analysis.*—Calcd. for $C_8H_{12}O_2$: C, 68.5; H, 8.6. Found: C, 68.6; H, 8.5.

Significant infrared maxima at $5.7\mu$ (s) and $6.3\mu$ (s). The nuclear magnetic resonance spectrum was in complete agreement with the structure assigned.

EXAMPLE 7

Using the same general procedure as Example 6, 98 g. (1.4 moles) of ethoxyacetylene, 250 ml. of acetonitrile and 98 g. (1.4 moles) of dimethylketene gave 137 g. (70%) of 3-ethoxy-4,4-dimethyl-2-cyclobuten-1-one.

EXAMPLE 8

To a stirred solution of 51 g. (0.73 mole) of ethoxyacetylene in 150 ml. of hexane at room temperature was added 92 g. (0.73 mole) of butylethylketene. Stirring was continued for 6 hours at room temperature, then the solution was refluxed for 12 hours. Distillation through a 10-inch Vigreux column gave 73 g. (15%) of 2-butyl-3-ethoxy-2-ethyl-3-cyclobuten-1-one, B.P. 88° (0.8 mm.), $n_D^{20}$ 1.4665. Also unreacted butylethylketene and unidentified material boiling at 129–132° (0.6 mm.) were obtained.

Production of a novel ketene dimer is illustrated by the next example.

EXAMPLE 9

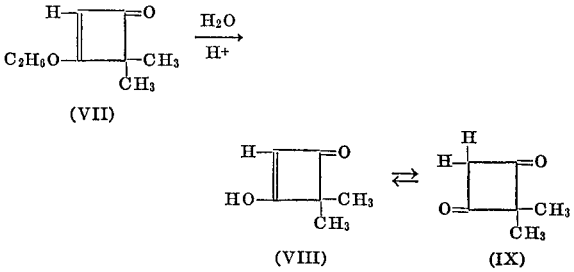

3-ethoxy-4,4-dimethyl-2-cyclobuten-1-one (VII), as produced in Example 6, was subjected to hydrolysis in 5% hydrochloric acid solution at room temperature, giving a 76% yield of 3-hydroxy-4,4-dimethyl-2-cyclobutenone (VIII), M.P. 131–132° C.

*Analysis.*—Calcd. for $C_6H_8O_2$: C, 64.3; H, 7.2. Found: C, 64.1; H, 7.0.

The infrared spectrum spectrum (KBr pellet) showed two broad bands centered at 4.22 and $5.31\mu$, a sharp band at $5.88\mu$, and broad multiple bands centered at 6.6 to $7.5\mu$. The n.m.r. spectrum of a 20% solution in dimethylformamide was in agreement with the structure (VIII).

The product (VIII) of Example 9 is the enolic form of the mixed dimer of ketene and dimethylketene, the first known cyclobutane-type dimer (IX) involving ketene. It is a relatively strong acid ($pK_a$ 2.6). It and the other mixed dimers of ketenes are valuable chemical reagents. They can be employed for a number of types of reactions for which known dimers of ketenes have been used. They offer the advantage of producing reaction products of which the number and/or positions of the alkyl substituents differ from those of the products of the known dimers of ketenes. As a consequence a method is now provided for preparing products not previously obtainable or that were heretofore produced only by more difficult methods.

EXAMPLE 10

Under the general conditions of Example 7, the following ketenes and alkoxyacetylenes give the products shown:

| Ketene | Alkoxyacetylene | Product |
|---|---|---|
| $(C_8H_{17})_2C=C=O$ | $HC\equiv COC_2H_5$ |  |
| $(CH_3)_2C=C=O$ | $CH_3C\equiv COCH_3$ |  |
| $(CH_3)_2C=C=O$ | $HC\equiv COC_4H_9$ |  |
| $(C_2H_5)_2C=C=O$ | $C_4H_9C\equiv COC_2H_5$ |  |

The novel alkoxycyclobutenones can be converted to useful alkoxycyclobutanols by catalytic hydrogenation over a supported ruthenium catalyst at elevated pressure. The following example illustrates this.

EXAMPLE 11

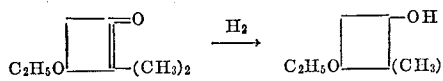

A solution of 10 g. of 3-ethoxy-4,4-dimethyl-2-cyclobuten-1-one in 75 ml. of cyclohexane was hydrogenated in an autoclave over 4 g. of 5% ruthenium on carbon catalyst at 50° C. and 1500 p.s.i. for 4 hrs. The catalyst was removed by filtration and the filtrate was evaporated to give 9.6 g. of residue. Vapor phase chromatography indicated that this residue was one component. The infrared spectrum was identical to that of 2,2-dimethyl-3-ethoxycyclobutanol, B.P. 96–97° C. at 2 mm., prepared by another procedure.

The alkoxycyclobutanols as prepared in Example 11 are useful as intermediates in the preparation of esters of various carboxylic acids, e.g., diesters of dicarboxylic acids such as adipic, azelaic or sebacic acids, which are useful as plasticizers for synthetic resins such as poly(vinyl chloride) or cellulose acetate butyrate. The next example illustrates preparation of such a diester.

EXAMPLE 12

A mixture of 100 g. of 2,2-dimethyl-3-ethoxycyclobutanol, 200 ml. of benzene, and 80 g. of pyridine was placed in a flask which was equipped with a stirrer, reflux condenser, and dropping funnnel, and 65 g. of adipyl chloride was added slowly. The mixture was stirred three hours and filterted. The solid (pyridine hydrochloride) was washed with beznene; the combined filtrates were washed with water, stripped of solvent, and distilled in a cyclic falling film molecular still to give 63 g. of bis(2,2-dimethyl-3-ethoxycyclobutyl)adipate, B.P. 82–94° ($25\mu$), $n_D^{20}$ 1.4568–1.4570.

*Analysis.*—Calcd. for $C_{22}H_{36}O_3$: sapon. equiv., 198. Found: sapon. equiv., 195.

The following example illustrates that the hydroxycyclobutenones can be present as the enol or keto form depending on the solvent in which they are dissolved.

EXAMPLE 13

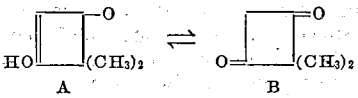

The infrared spectrum (KBr pellet) of 3-hydroxy-4,4-dimethyl-2-cyclobuten-1-one (prepared according to Example 9) showed two broad bands centered at $4.22$ and $5.31\mu$, a sharp band at $5.88\mu$, and broad multiple bands at 6.6 to $7.5\mu$. These bands are indicative of the enol form (A). The infrared spectrum of a solution of this material in chloroform showed none of the bands mentioned above, but a new sharp band at $5.70\mu$. This spectrum is consistent with keto form (B). The n.m.r. spectrum of a 20% solution of the compound in dimethylformamide showed single peaks at $-492$ c.p.s. (enolic —OH), $-182$ c.p.s. (C=CH) and $-49$ c.p.s. $[C(CH_3)_2]$. These data are indicative of the enol form (A), but the n.m.r. spectrum of its chloroform solution showed only single peaks at $-155$ c.p.s. $CH_2$ and $-57$ c.p.s. $[C(CH_3)_2]$ indicating the keto form (B).

The n.m.r. spectra were determined at 40 mc. and peak positions are reported in cycles per second relative to tetramethylsilane as an internal standard.

EXAMPLE 14

Under the general conditions of Example 9, the following alkoxycyclobutenones give the products shown. Although these products are shown in the enol form, it is understood that they are convertible into the keto form.

| Alkoxycyclobutenone | Product |
|---|---|
| 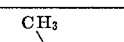 | 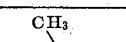 |
| 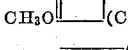 | 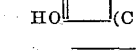 |
| 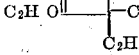 | 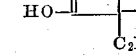 |

The keto forms of the novel hydroxycyclobutenones which have a methylene group ($-CH_2-$) in the four-membered ring have another valuable utility. Because of the active methylene group between the two carbonyl groups these compounds can be used to prepare cyanine dyes useful as spectral sensitizers for photographic silver halide emulsions. The procedure comprises condensing the keto form of the novel compound of the formula,

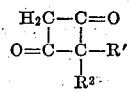

with one of the well-known "I.C.I intermediates" such as 2 - β - acetanilidovinyl - 3 - ethylbenzoxazolium iodide, which are disclosed, e.g., in British Patent No. 344,409 and U.S. Patent No. 2,870,014.

The reaction is carried out by heating the reactants, e.g., in equimolar proportions, in the presence of a basic condensing agent, e.g., triethylamine, and an inert diluent such as ethanol, propanol, 1,4-dioxane, etc. Temperatures from ambient temperature to the reflux temperature of the reaction mixture can be used. The resulting dye is recovered by filtration and recrystallization. Suitable procedures are disclosed in U.S. Patent 2,870,014 which also discloses well-known procedures by which the cyanine dyes formed from the aforesaid hydroxycyclobutenone compounds can be incorporated in photographic silver halide emulsions as spectral sensitizers.

The preparation of such a cyanine dye is illustrated by the following example.

EXAMPLE 15.—4 - [(3 - ETHYL - 2 - BENZOXA-ZOLINYLIDENE)ETHYLIDENE] - 2,2 - DIMETH-YL-1,3-CYCLOBUTANEDIONE 2,2 - dimethyl - 1,3 - cyclobutanedione (0.56 g., 1 mol.) and 2 - β - acetanilidovinyl - 3 - ethylbenzoxazolium iodide (2.18 g., 1 mol.) and triethylamine (1.4 ml., 1 mol.+100%) were dissolved in ethanol (10 ml.) and the mixture heated under reflux for ten minutes. After chilling, the reaction mixture was diluted with chloroform (1000 ml.) and washed with several 100 ml. portions of water. After drying, the chloroform solution was chromatographed on a 12-inch column of neutral alumina 1 inch in diameter. After concentrating the desired fraction, the residue was twice recrystallized from benzene. The yield of purified dye was 1.1 g. (79%), M.P. 188–190° C. dec.

The novel alkoxycyclobutenone compounds are useful not only as chemical intermediates but can also be used directly as plasticizers for synthetic resins. The following example illustrates the use as a plasticizer.

EXAMPLE 16

Fifteen parts of 2 - butyl - 3 - ethoxy - 2 - ethyl - 3-cyclobuten-1-one is milled on heated rolls with 85 parts of cellulose acetate butyrate resin to give a tough plasticized resin with improved molding properties.

The examples given hereinbefore are intended to be illustrative and not limitative of the invention. It is obvious that numerous other compounds of the invention in addition to those specifically disclosed can be prepared. Thus by the use of ethylene diamine ($H_2NCH_2CH_2NH_2$), 1,3 - propane diamine ($H_2NCH_2CH_2CH_2NH_2$) 1,4-butane diamine ($H_2NCH_2CH_2CH_2CH_2NH_2$) and 1,5-pentane diamine [$H_2N(CH_2)_5NH_2$] respectively, in place of 1,6-hexane diamine [$H_2N(CH_2)_6NH_2$] in Example 4 of the formulas of the resulting products would differ from that shown in Example 4 in that the connecting linkage in the products would be $$-\overset{H}{N}(CH_2)_2\overset{H}{N}-, -\overset{H}{N}(CH_2)_3\overset{H}{N}-, -\overset{H}{N}(CH_2)_4- \text{ and } -\overset{H}{N}(CH_2)_5\overset{H}{N}-$$

respectively, instead of $$-\overset{H}{N}(CH_2)_6\overset{H}{N}-$$

Similarly, $R_1$, $R_3$, $R_4$, $R_5$ and $R_6$ can represent higher alkyl groups than those specifically disclosed in the examples illustrating the invention.

The novel 3-amino-2-cyclobuten-1-one compounds of the invention are useful as corrosion inhibitors for ferrous alloys. The compounds having the Formula 1 can be converted to the corresponding 3-hydroxycyclobutenone compounds by hydrolysis. The hydrolysis can be effected, for example, with a 5% hydrochloric acid solution. As shown hereinbefore the keto forms of the 3-hydroxycyclobutenone compounds can be used to prepare cyanine dyes useful as spectral sensitizers for photographic silver halide emulsions.

The invention has been described in detail with particular reference to preferred embodiments thereof, but it will be understood that variations and modifications can be effected within the spirit and scope of the invention as described hereinbefore and as defined in the appended claims.

I claim:

1. The cyclobutenone compounds having the formula:

$$O=C-C-R_1 \quad R_1-C-C=O$$
$$R_3-C-C-\text{X}-C-C-R_3$$
$$\quad R_4 \quad\quad\quad R_4$$

or $$O=C-C-R_1 \quad R_1-C-C=O$$
$$R_3-C-C-N\text{—S—}N-C-C-R_3$$
$$\quad R_4 \quad\quad\quad\quad\quad R_4$$

wherein $R_1$ represents a member selected from the group consisting of a hydrogen atom and a lower alkyl radical having from 1 to 4 carbon atoms, $R_3$ and $R_4$ each represents an alkyl radical having from 1 to 10 carbon atoms, X represents a $$-\overset{H}{N}CH_2-\langle S \rangle-CH_2-\overset{H}{N}-$$

radical or a $$-\overset{H}{N}-(CH_2)_n\overset{H}{N}-$$

radical, and $n$ represents a whole number from 2 to 6.

2. The cyclobutenone compounds of claim 1 having the Formula 1.

3. The cyclobutenone compounds of claim 1 having the Formula 2.

4. 3-anilino-4,4-dimethyl-2-cyclobuten-1-one.

5. 3 - bicyclo[3.2.2] - 3 - azanonyl - 4,4 - di - n - butyl-2-cyclobuten-1-one.

6. The process which comprises reacting a 3-alkoxy-2-cyclobuten-1-one having the formula:

$$R_1-C-C=O$$
$$R_2O-C-C-R_3$$
$$\quad\quad R_4$$

with an amine having the formula:

$$\overset{R_5}{HN-R_6}$$

at a temperature in the range of about 10° to about 150° C. and recovering a product having the formula:

$$R_5 \quad R_1-C-C=O$$
$$\quad\diagdown N-C-C-R_3$$
$$R_6 \quad\quad\quad R_4$$

wherein $R_1$ represents a member selected from the group consisting of a hydrogen atom and a lower alkyl radical, $R_2$ represents a lower alkyl radical, $R_3$ and $R_4$ each represents an alkyl radical having from 1 to 10 carbon atoms, $R_5$ and $R_6$ each represents a member selected from the group consisting of a hydrogen atom, an alkyl radical having from 1 to 10 carbon atoms, a cyanoalkyl radical having up to 3 carbon atoms, a hydroxyalkyl radical having up to 3 carbon atoms, phenyl, methylphenyl, methoxyphenyl and ethoxyphenyl and wherein $$-N\diagup^{R_5}_{\diagdown R_6}$$

collectively, can be a cyclic monoamine radical selected from the group consisting of morpholine, piperidine, pyrrolidine and 3-azabicyclo [3.2.2]nonane.

7. The process according to claim 6 wherein $R_1$, $R_5$ and $R_6$ each represents a member selected from the group consisting of a hydrogen atom and a lower alkyl radical and $R_2$, $R_3$ and $R_4$ each represents a lower alkyl radical.

References Cited

UNITED STATES PATENTS 3,282,924  11/1966  Ait et al. _____ 260—563

OTHER REFERENCES

Hasek et al.: J. Org. Chem., vol. 29, pp. 2510–2513 (1964).

Van Daalen et al.: Rec. Trav. Chim., vol. 80, pp 810–818 (1961).

ALTON D. ROLLINS, *Primary Examiner.*

UNITED STATES PATENT OFFICE
CERTIFICATE OF CORRECTION

Patent No. 3,408,344                  October 29, 1968

James C. Martin

It is certified that error appears in the above identified patent and that said Letters Patent are hereby corrected as shown below:

Column 6, lines 53 to 56, formula (VII) should appear as shown below:

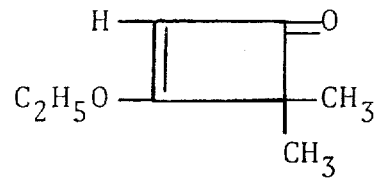

Column 8, in the table, first column, the second formula should appear as shown below:

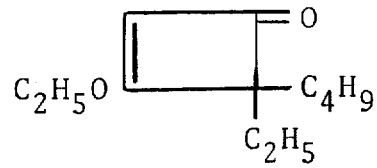

Signed and sealed this 10th day of March 1970.

(SEAL)
Attest:

EDWARD M. FLETCHER, JR.                  WILLIAM E. SCHUYLER, JR.
Attesting Officer                           Commissioner of Patents